Figure 1:
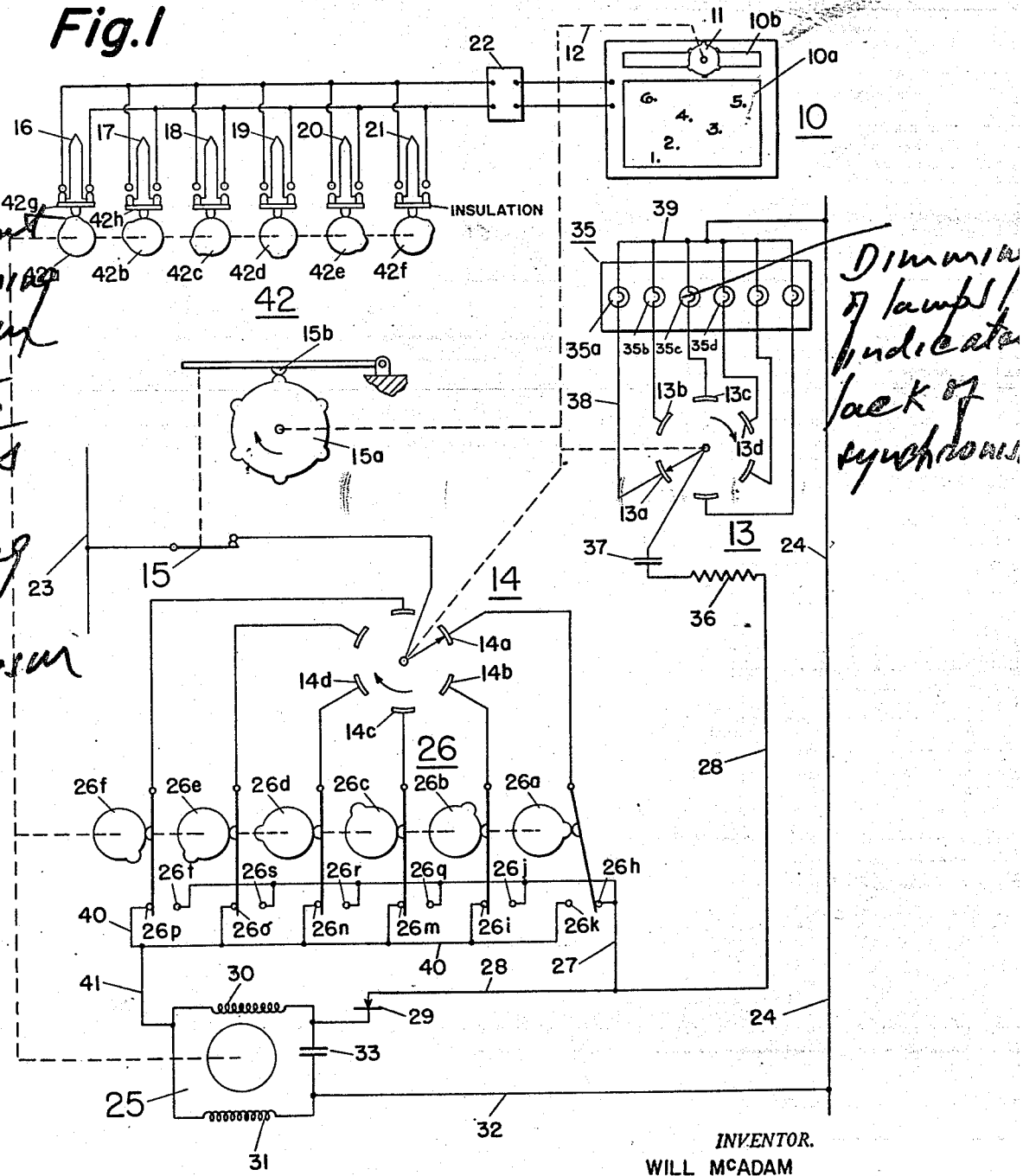

Oct. 27, 1953          W. McADAM          2,657,376

CONTROL SYSTEM FOR MULTIPLE-POINT MEASURING INSTRUMENT

Filed Dec. 23, 1949          2 Sheets-Sheet 1

INVENTOR.
WILL McADAM
BY
Woodcock and Phelan
ATTORNEYS

Patented Oct. 27, 1953

2,657,376

UNITED STATES PATENT OFFICE 2,657,376

CONTROL SYSTEM FOR MULTIPLE-POINT MEASURING INSTRUMENT

Will McAdam, Ambler, Pa., assignor to Leeds and Northrup Company, Philadelphia, Pa., a corporation of Pennsylvania Application December 23, 1949, Serial No. 134,670

8 Claims. (Cl. 340—213)

This invention relates to the indicating, recording and/or control in sequence from a distance of a plurality of variable conditions and has for an object the provision of a system for maintaining in synchronism the operation of a remotely located circuit controller with the measuring and/or controlling equipment.

In the control of many processes, and in studies made of various kinds of equipment, it is frequently desirable and necessary to measure in sequence and as rapidly as possible the magnitudes of a plurality of conditions, such as temperature, in order that information may be provided as to the magnitudes or change in magnitudes of a plurality of conditions in a process or equipment.

Where the measuring instrument is located sufficiently near the apparatus under test, a transfer switch has in the past been provided to connect in sequence the condition-responsive devices into the measuring network, the transfer switch being driven by the measuring instrument. However, where it is not feasible to utilize the measuring instrument near the site of the measurements, the problem of maintaining synchronism between a remotely located transfer switch and the measuring instrument has been difficult of solution and has been solved only by relatively complicated control systems. Additionally, it has been deemed desirable to include a signalling system to indicate the particular condition under measurement and, likewise, to provide a record of the change in each condition which, by its distinctive character on a record chart, may be distinguished from other records appearing thereon.

In the past the transfer switch of the measuring instrument has been located within the instrument housing and, hence, the temperature of the switch follows that within the housing which may not be of uniform value, giving rise to the possibility of differing temperatures in different parts of the measuring circuit which, of course, gives rise to thermal effects on low-level measuring circuits. Accordingly, it is deemed desirable in such cases to locate the transfer switch externally of the measuring instrument and to provide a transfer switch which is specially designed to minimize disturbances in the measuring circuit, such a transfer switch not being particularly adapted for direct drive from the measuring instrument. The present invention is particularly applicable to such applications, though the measuring apparatus as a whole is not remotely located from the condition-responsive devices, such as the thermocouples.

It is a further object of the present invention to provide a control system which is reliable, simple, and which maintains synchronism between the measuring instrument and a remotely located transfer switch.

A further object is to provide automatic means to re-establish synchronism between the measuring instrument and the transfer switch whenever the one gets out of step with the other, and also to provide a signalling system which not only indicates the particular condition under measurement, but which also signals the operator that the transfer switch and the measuring instrument are out of synchronism.

In carrying out the invention in one form thereof a transfer switch driven by any suitable driving means remotely located from the measuring instrument is provided with control circuits which not only control the driving means sequentially to connect the condition-responsive devices to the measuring instrument, but which also maintains the operation of the transfer switch in synchronism or in predetermined angular relation with a rotatable element of the measuring instrument.

Included in the control circuits are signalling circuits for producing an indication by signal lamps not only to assure the operator of proper synchronous operation, but also distinctively to inform him whenever there is asynchronous operation. More specifically, there is provided a circuit controller driven by the measuring instrument in sequence through a plurality of positions. A circuit is established through the instrument-driven circuit controller to the remotely located driving means or motor which not only causes it to move from one circuit-controlling position to another, but also to maintain its transfer switch in synchronous or predetermined timed relation with the instrument-operated circuit controller and to move it into synchronous relation whenever the one gets out of step with the other. The motor is provided with automatic braking means and in the event of asynchronous operation, greatly reduced voltage is applied to the signalling lamps to reduce their illumination to indicate to the operator that the transfer switch is then out of step with the measuring instrument.

Figure 2:
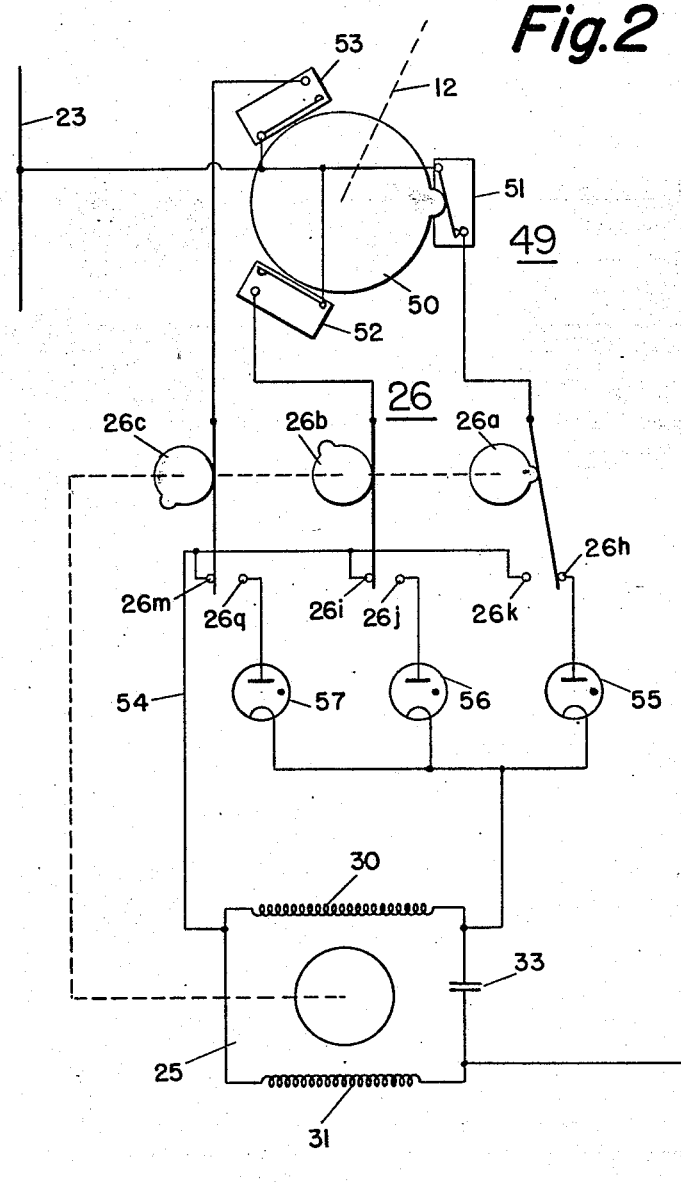

For a more detailed description of the invention and for further objects and advantages thereof, reference is to be had to the following description taken in conjunction with the accompanying drawings, in which:

Fig. 1 diagrammatically illustrates a wiring diagram with the several circuit controllers and transfer switches diagrammatically shown; and Fig. 2 diagrammatically illustrates a modification of the invention.

Referring to the drawings, the invention in one form has been shown as applied to a multiple-point measuring instrument 10 which may be of any suitable type, such for example as that disclosed in Ross et al. Patent 2,113,069 and which includes therein the disclosure of a transfer switch 85 for connecting in sequence to the measuring circuit of the instrument a plurality of thermocouples. The transfer switch as shown in Fig. 13 of said patent is operated in sequence with the printwheel by means of the illustrated ratchet mechanism. The operation is such that as the printwheel is advanced from one position to another, the transfer or selector switch 85 serves to connect in sequence into the measuring circuit each of the plurality of thermocouples. A thermocouple remains connected in the circuit until the measuring instrument has operated to measure the temperature to which it is subjected and has printed on the record sheet a number indicative of the particular thermocouple then connected to the circuit and at a position on the chart which is indicative of the magnitude of the temperature.

It is to be understood that the present invention has been applied to an instrument of the character disclosed in said Ross et al. patent, and in Fig. 1 of the accompanying drawing the printwheel 11 of instrument 10 is similarly operated and the connection indicated by the broken line 12 corresponds with the shaft 80 of Fig. 13 of said Ross et al. patent for rotating in synchronism with the printwheel 11 multiple-point switches 13 and 14 and the cam 15a which operates a circuit interrupter.

As shown, a thermocouple 16 is connected to the input circuit of instrument 10 through preamplifier 22. It will, of course, be understood that thermocouples 17—21 are to be connected in sequence to the instrument 10. Though not always needed, where the thermocouples 16—21 have low signal outputs and are remotely located from the measuring instrument 10, it is desirable to include in the input circuit thereto the preamplifier 22 to increase the amplitude of the output from each thermocouple to a value at least within the range for proper operation of the instrument 10.

With the parts in their illustrated positions there is established between alternating current supply lines 23 and 24 a circuit for flow of a braking current for a motor 25 which may be traced from line 23 through circuit interrupter 15, stationary segment 14a of multiple-point switch 14, stationary contact 26h of a multiple-point circuit controller 26, conductors 27 and 28, a rectifier 29, motor windings 30 and 31, and by conductor 32 to the other supply line 24. Unidirectional current therefore flows through the rectifier 29 and the motor windings 30 and 31, which unidirectional current is effective to oppose rotation of the rotor of the motor 25 and when it is in motion is effective rapidly to brake the motor to standstill. The motor 25 is illustrated as of the induction type with a phase-splitting capacitor 33.

The foregoing braking circuit for motor 25 also forms a part of an energizing circuit for the first signal lamp 35a of the bank 35, which circuit may be traced from stationary contact 26h by conductors 27 and 28, resistor 36, capacitor 37, stationary segment 13a of multiple-point switch 13, conductor 38, signal lamp 35a, and by conductor 39 to the other supply line 24. Thus, alternating current flows through the capacitor 37, the current being adequate to energize the signal lamp 35a to normal brilliance. The capacitor 37 serves to block from the lamp unidirectional current flowing in the circuit including the rectifier 29, while resistor 36 aids the capacitor in limiting the magnitude of the current flow. By decreasing the size of the capacitor, the resistor 36 may be omitted.

The bank 35 of signal lamps may be located as desired, either adjacent the measuring instrument 10 or near the remote location of the thermocouples 16—21. Obviously, banks of signal lights may be located at both positions, the two banks being connected in parallel under the control of the multiple-point switch 13.

After connection of thermocouple 16 to the instrument 10 through the preamplifier 22, the printwheel 11 is moved transversely of the record chart 10a, a suitable index being simultaneously moved relative to the scale 10b to indicate the magnitude of the temperature to which thermocouple 16 is subjected. After a predetermined time interval adequate to balance the measuring circuit, which may be of the potentiometer type disclosed in said Ross et al. patent, the printwheel 11 is moved downwardly into engagement with chart 10a to print thereon a numeral or other character which is distinctive and serves to identify thermocouple 16. For example, the printwheel may have numerals 1–6. Thus, the aforesaid printing operation would place upon the chart 10a the numeral "1" indicating the measurement of the temperature to which the first thermocouple 16 of the series had been subjected.

After the printing operation, the printwheel 11 is moved to its next position to bring the next numeral "2" into position preparatory to printing. Simultaneously, through the driving connection 12 the multiple-point switches 13 and 14 are advanced to complete circuits through stationary contact segments 13b and 14b. During the initial movement of multiple-point switches 13 and 14 a cam 15a is rotated to open the circuit interrupter 15 prior to interruption of the circuit through contact segment 14a. The circuit interrupter 15 thus performs the duty of opening and closing the circuit through each of the respective contact segments. This is advantageous in avoiding any arcing at the multiple-point switch 14. Though the multiple-point switch 14 may comprise a plurality of circuit interrupters operable in sequence, it has been found more economical to provide the single circuit interrupter designed for the duty of making or breaking the motor control circuits.

Further in accordance with the invention, a crest of cam 15a is moved against cam follower 15b to close circuit interrupter 15 after the multiple-point switches 13 and 14 have completed their respective circuits through contact segments 13b and 14b. When the circuit interrupter 15 is closed, an energizing circuit is completed through contact 14b, the stationary contact 26i of switch 26, conductors 40 and 41, the motor windings 30 and 31 and by conductor 32 to the other supply line 24.

The motor 25 is thereupon energized to rotate the cams of switch 26 in a clockwise direction and in synchronism therewith to rotate the cams of selector switch 42. Switch member 42g immediately moves under the control of cam 42a to disconnect both sides of thermocouple 16 from the input circuit to preamplifier 22. The cam 42b, however, engages switch member 42h to connect thermocouple 17 to the input circuit prior to removal of thermocouple 16 therefrom. There is thus avoided any opening of the input circuit. Meanwhile, the cam 26b moves its associated switch member to interrupt the motor energizing circuit through stationary contact 26i and to complete a braking circuit through the stationary contact 26j which, as before extends by way of conductors 27 and 28, rectifier 29, through the motor windings and by conductor 32 to the other supply line 24. The motor 25 is thereupon braked to standstill with the braking circuit maintained through stationary contact 26j and the thermocouple 17 connected to the input circuit of preamplifier 22. The measuring instrument 10 thereupon functions to move the print wheel 11 relative to the chart 10a preparatory to the printing of numeral "2" on the chart to record the temperature to which the thermocouple 17 is subjected.

It is again emphasized that the circuit interrupter 15 is operated by cam 15a to closed position after the circuit has been completed through the segment 14b, this operation being achieved by providing the cam 15a with narrower crests than the conducting segments of selector switch 14 so that the circuit through each segment thereof is completed before closure of circuit interrupter 15, and so that each circuit through each segment of the selector switch 14 is interrupted after the opening of the circuit interrupter 15.

With the foregoing understanding of the invention, it will be seen that after the measurement of the temperature to which thermocouple 17 is subjected, the system functions to measure in succession the temperatures to which thermocouples 18—21 are subjected.

In accordance with the present invention, it will be observed that the switch member of each single-pole, double-throw switch associated with each of cams 26b-26f is in contact with associated stationary contacts 26i, 26m-26p for partial completion of an energizing circuit for rotation of motor 25. However, the switch member associated with cam 26a is in engagement with stationary contact 26h.

By reason of the foregoing provisions, if motor-operated switches 26 and 42 should for any reason whatever get out of step or out of synchronism with selector switches 13 and 14, a motor-running circuit will be completed. For simplicity of explanation, it will be assumed that a circuit will be completed through segment 14d of switch 14 but that motor-driven switches 26 and 42 are in the position shown in Fig. 1. Even though the switch member of cam 26a is engaging stationary contact 26h, the circuit therethrough will be broken at the segment 14a. However, there will be completed an energizing circuit for the motor 25 which may be traced from supply line 23 through circuit interrupter 15, contact segment 14d, switch member associated with cam 26d, stationary contact 26n, conductors 40 and 41, motor windings 30 and 31, and by conductor 32 to the other supply line 24. Thus, the motor will be energized to rotate the switches 26 and 42 in clockwise direction.

It is to be observed the signal energizing circuit for the lamp 35a will be open at the conducting segment 14a. However, a current of small magnitude, small because limited by the impedance of the motor including phase-splitting capacitor 33, can flow from supply line 24 by way of lamp 35d, conducting segment 13d, capacitor 37, resistor 36, conductor 28, rectifier 29, through the motor circuit and, hence, through contact 26n, segment 14d, and by way of circuit interrupter 15 to the other supply line 23. By reason of capacitor 37 in the foregoing circuit, only the ripple current of rectifier 29 flows through lamp 35d. The magnitude of the current flow provides a barely perceptible glow in the filament of lamp 35d and provides a distinctive signal that the motor-driven switches 26 and 42 are out of synchronism with the selector switches 13 and 14. The low intensity illumination of each signal lamp is desirable since it is then known that the lamp has not "burned out" and that asynchronous operation has occurred.

The foregoing signal persists as the motor 25 rotates switches 26 and 42 in clockwise direction. Though cams 26b and 26c in turn move their switch members to engage stationary contacts 26j and 26q, braking circuits are not completed. The cams 42b and 42c in succession connect thermocouples 17 and 18 to measuring instrument 10, but they are only momentarily connected to the input circuit since the motor 25 actuates the switches 26 and 42 at substantial speed with a small time interval between each circuit-controlling position. However, as the cam 26d moves its switch member into engagement with stationary contact 26r, a braking circuit is completed and the motor 25 quickly comes to standstill with the switches 26 and 42 again in step or in synchronism with the selector switches 13 and 14. The signal lamp 35d is then energized with normal brilliance, since there is completed through contact 26r an energizing circuit which extends by way of conductors 27 and 28 directly to the lamp 35d instead of through the motor, as previously described.

It will now be understood that similar synchronizing operations will automatically take place whenever motor-driven switches 26 and 42 get out of angular step with the selector switches 13 and 14 and that synchronization will be reestablished in a time interval which is small compared with the time interval of a few seconds ordinarily required for the measuring instrument 10 to complete its cycle of measuring and recording operations for each thermocouple. Accordingly, even though asynchronous operation should momentarily occur, adequate time will remain for proper measurement of the temperature to which each thermocouple is subjected.

Though the control system is simple, its advantages are great. It has not been found necessary to utilize relays. Though relays could be utilized, as for example in place of the interrupter 15 and the cam 15a, greater reliability has been achieved without the use of such a relay and the possible service requirements incident to the use of relays. The system is rugged, foolproof and highly reliable. Neither the capacitor 37 nor the capacitor 33 is short-circuited at any time by any of the contacts, thus avoiding possibility of welding or adherence of the contacts one to the other.

While a measuring instrument of the type shown in said Ross et al. patent has been referred to as suitable for the instrument 10, it is to be understood that other types of measuring instruments can be utilized, such for example as shown in Williams Patent 2,113,164.

In the foregoing description and in the claims, reference has been made to the single-pole, double-throw switch associated with each of the cams 26a–26f. It is to be understood that any electrical equivalent of the single-pole, double-throw switch is intended to be covered by the term though there be more than a single movable switching element.

Further in connection with the braking circuit, it is to be observed that the flow of unidirectional current from the rectifier 29 is through winding 30 and then in series through winding 31 of the motor 25. Thus, the ripple current is in phase in the respective motor windings 30 and 31 in avoidance of development of torque by the motor 25 which would tend to cause it to rotate or "creep." Moreover, the capacitor 33 being in shunt with windings 30 and 31 on the rectifier side of the winding, serves as a by-pass for ripple current, reducing the magnitude thereof in windings 30 and 31.

While separate cams 26a–26f have been illustrated for the multiple-point controller 26, it is to be understood that a single cam may be utilized with each multiple-point switch disposed at a 60° angle with respect to the crest of the single cam. Thus, each switch would be operated in manner described for the controller 26 by the crest of the single cam. In one embodiment of the invention this arrangement has proved to be entirely satisfactory. Similarly, a single cam could be utilized for the multiple-point circuit controller 42. Obviously, each multiple-point switch or circuit controller can be provided with any desired number of points or switch positions, the only limit being the physical size of the assembly, the angular disposition of each switch where located in annular array about a single cam being varied according to the number of switches or points to be utilized.

Referring to Fig. 2, there has been illustrated diagrammatically a fractional part of the system of Fig. 1 with circuit variations to simplify the signalling circuits. As in Fig. 1, through mechanical connection 12 which, of course, may be a shaft, a cam 50 is rotated in synchronism with the printwheel 11 of the recorder 10 of Fig. 1 to operate the multiple-point switch 49. Instead of the conducting segments of the multiple-point switch 14, there have been shown in Fig. 2 individual circuit interrupters 51, 52 and 53 which in conjunction with cam 50 perform the dual functions of the multiple-point switch 14 and the circuit interrupter 15 of Fig. 1. The cam 50 and the arrangement of the circuit interrupters 51–53 are also illustrative of the single cam arrangement above described with reference to multiple-point controllers 26 and 42.

For convenience, the multiple-point controller 26 has been illustrated with three circuit-controlling points, at each of which there is provided a single-pole, double-throw switch, the operation of each of which is under the control of the cams 26a, 26b and 26c. The braking circuit is shown established from supply line 23 by way of circuit interrupter 51, in closed position by the crest of cam 50, the stationary contact 26h, a rectifier or diode 55 of the gaseous conduction type such as mercury vapor, and by way of windings 30 and 31 of motor 25 to the other supply line 24. Advantage is taken of the fact that such a rectifier, particularly of the mercury vapor type, has a pronounced color, as bluish-green, when operating near full capacity. Thus, the rectifier 55 will have a distinctive color as compared with the color of rectifiers 56 and 57 connected in branches of the braking circuit which have not yet been connected to the alternating source. Inasmuch as each of rectifiers 55–57 has a hot cathode, the filament supply circuits being omitted for sake of simplicity, there will be visible in each rectifier tube the reddish glow of the heated cathode which will provide an indication that each tube is operative and ready for operation when a braking circuit is completed therethrough.

When the cam 50 is advanced to the angular position corresponding with the location of the circuit interrupter 52, the foregoing braking circuit through rectifier 55 will have been broken and the circuit through interrupter 52 will be completed to establish an energizing circuit through stationary contact 26i and by conductor 54, motor windings 30 and 31 to the other supply line 24. Thus, the motor 25 will be energized to rotate the cams 26a–26c in a clockwise direction until cam 26b operates its associated single-pole, double-throw switch to interrupt the motor-energizing circuit through contact 26i and to complete a braking circuit through stationary contact 26j for flow of unidirectional braking current through rectifier 56, and thence through the motor windings in manner previously described. Thus, the rectifier 56 will again indicate that the multiple-point circuit controller 26 has an angular position corresponding with that of the multiple-point switch 49.

In order that there be adequate braking current, it is desirable, if not necessary, that each of the rectifiers 55–57 have a low potential drop. That is to say, that they be selected or designed for flow therethrough of adequate current quickly to brake the motor 25 to standstill.

In the event of asynchronous operation, the system operates in the same manner as the system of Fig. 1 to bring the multiple-point switch 26 into synchronism or predetermined angular relation with the multiple-point switch 49.

Other changes within the scope of the appended claims may now suggest themselves to those skilled in the art.

What is claimed is:

1. A control system comprising a first multiple-point circuit controller, means for advancing said circuit controller from one circuit-controlling position to another, a second multiple-point circuit controller including at each point a single-pole, double-throw switch, each of said switches, except one, being in corresponding circuit-controlling positions, a driving motor for operating said switches in sequence between circuit-controlling positions, an energizing circuit for said driving motor partially completed through said switches in their corresponding switch positions and which energizing circuit is completed by movement of said first multiple-point controller from one position to another, the resultant energization and rotation of said motor thereafter opening its said energizing circuit through one of said single-pole, double-throw switches, and a braking circuit completed by said last-named single-pole, double-throw switch for bringing said motor and said second multiple-point controller to standstill in predetermined angular relation with said first multiple-point controller.

2. The combination set forth in claim 1 in which there is provided a third multiple-point circuit controller, signalling means rendered distinctive as said third controller is moved from one position to another, said advancing means for said first multiple-point controller also actuating said third controller in synchronism therewith, an energizing circuit for said signalling means completed by said third controller, said energizing circuit being connected to said motor circuit for application of a lower degree of energization when said second multiple-point circuit controller is out of predetermined angular relation with said first multiple-point circuit controller and effective for application to said signalling circuit of a higher degree of energization when said two switches remain in said predetermined angular relation one to the other.

3. A control system for a multiple-point transfer switch comprising a first multiple-point circuit controller, means for advancing said circuit controller from one circuit-controlling position to another, a second multiple-point circuit controller including at each point a single-pole, double-throw switch, each of said switches, except one, being in corresponding circuit-controlling positions, a driving motor for operating said switches in sequence between circuit-controlling positions and for operating the transfer switch in synchronism therewith, an energizing circuit for said driving motor partially completed with said switches in said corresponding switch positions and which energizing circuit is completed by movement of said first multiple-point controller from one position to another, the resultant energization and rotation of said motor opening said energizing circuit through the single-pole, double-throw switch connected to the point of said first multiple-point controller to which it has been operated, and a braking circuit completed by said last-named single-pole, double-throw switch for bringing said motor and said second multiple-point circuit controller to standstill in predetermined angular relation with said first multiple-point controller.

4. A signalling system for a controller including a multiple-point circuit controller having a plurality of single-pole, double-throw switches operable in sequence between their circuit-controlling positions, a motor for advancing said circuit controller for operation of first one of said switches and then another, an alternating current energizing circuit for said motor normally partially completed by all except one of said single-pole, double-throw switches while in corresponding circuit-controlling positions, a braking circuit for said motor partially completed by said one of said single-pole, double-throw switches, said braking circuit including a rectifier, a first multiple-point switch having each point thereof connected in series with one of said single-pole, double-throw switches for completion of said braking circuit when in angular relation corresponding with said one of said switches, a second multiple-point switch operable with said first multiple-point switch, signalling means corresponding with each position of said second multiple-point switch and including an energizing circuit controlled thereby, said energizing circuit for said signalling means including a part, and being under the control, of said braking circuit for normal energization of said signalling means.

5. A signalling system for a controller including a multiple-point circuit controller having a plurality of single-pole, double-throw switches operable in sequence between their circuit-controlling positions, a motor for advancing said circuit controller for operation of first one of said switches and then another, an alternating current energizing circuit for said motor normally partially completed by all except one of said single-pole, double-throw switches while in corresponding circuit-controlling positions, a braking circuit for said motor partially completed by said one of said single-pole, double-throw switches, said braking circuit including a rectifier, a multiple-point switch having each point thereof connected in series with one of said single-pole, double-throw switches for completion of said braking circuit when in angular relation corresponding with said one of said switches, a second multiple-point switch operable with said first multiple-point switch, signalling means corresponding with each position of said second multiple-point switch and including an energizing circuit controlled thereby, said energizing circuit for said signalling means including a part, and being under the control, of said braking circuit for normal energization of said signalling means, and upon asynchronous operation of said controller and said multiple-point switch said signalling circuit having reduced energization to signal said asynchronous operation.

6. A signalling system for a controller including a multiple-point circuit controller having a plurality of single-pole, double-throw switches operable in sequence between their circuit-controlling positions, a motor for advancing said circuit controller for operation of first one of said switches and then another, an alternating current energizing circuit for said motor normally partially completed by all except one of said single-pole, double-throw switches while in corresponding circuit-controlling positions, a braking circuit for said motor partially completed by said one of said single-pole, double-throw switches, said braking circuit including a rectifier, a multiple-point switch having each point thereof connected in series with one of said single-pole, double-throw switches for completion of said braking circuit when in angular relation corresponding with said one of said switches, a second multiple-point switch operable with said first multiple-point switch, signalling means corresponding with each position of said second multiple-point switch and including an energizing circuit controlled thereby, said energizing circuit for said signalling means including a part, and being under the control, of said braking circuit for normal energization of said signalling means, and upon asynchronous operation of said controller and said multiple-point switches said signalling circuit extending through said rectifier and through said motor for application of substantially ripple current only to said signalling means to indicate said asynchronous operation.

7. A control system for the multiple-point transfer switch of a multiple-point measuring instrument, comprising a first multiple-point circuit controller, means for advancing said circuit controller from one circuit-controlling position to another, a second multiple-point circuit controller including at each point a single-pole, double-throw switch, each of said switches, except one, being in corresponding circuit-controlling positions, a driving motor having motor windings for operating said switches in sequence between circuit-controlling positions, an alternating current energizing circuit for said driving motor partially completed with said switches in said corresponding switch positions and which energizing circuit is completed by movement of said first multiple-point controller from one position to another, the resultant energization and rotation of said motor opening said energizing circuit through the single-pole, double-throw switch connected to the point of said first multiple-point controller to which it has been operated, and a braking circuit, including a half-wave rectifier, completed by said last-named single-pole, double-throw switch for bringing said motor and said second multiple-point circuit controller to standstill in predetermined angular relation with said first multiple-point controller, said braking circuit including in series therein said windings for flow in phase therethrough of the ripple current from said rectifier in avoidance of development of torque by said motor due to said ripple current.

8. A control system comprising a first multiple-point switch, means for advancing the switch from one circuit-controlling position to another, a driving motor, a second multiple-point switch operable by said driving motor from one circuit-controlling position to another, an energizing circuit for said driving motor which is effective upon movement of said first multiple-point switch from one of its circuit-controlling positions to another and which circuit is completed through one of the points of said second multiple-point switch for rotation of said motor until said second switch is in predetermined angular relation with said first switch, said motor then being de-energized by said second switch, and a braking circuit for said motor completed upon arrival of said second switch in its said predetermined angular position quickly to bring said second switch and said motor to standstill, said braking circuit including branches one for each point of said second multiple-point switch and including in each branch a rectifier of the gaseous discharge type which by its distinctive color indicates the arrival of said second multiple-point switch in predetermined angular relation with said first multiple-point switch.

WILL McADAM.

References Cited in the file of this patent

UNITED STATES PATENTS

| Number | Name | Date |
|---|---|---|
| 1,965,393 | Schleicher | July 3, 1934 |
| 2,428,402 | Winterbottom | Oct. 7, 1947 |
| 2,430,113 | Handley | Nov. 4, 1947 |
| 2,430,125 | Kipnis | Nov. 4, 1947 |
| 2,478,221 | Alford | Aug. 9, 1949 |
| 2,502,215 | Giffen et al. | Mar. 28, 1950 |
| 2,549,401 | Stein et al. | Apr. 17, 1951 |

FOREIGN PATENTS

| Number | Country | Date |
|---|---|---|
| 562,264 | Germany | Oct. 24, 1932 |